United States Patent [19]

Keem et al.

[11] Patent Number: 4,693,933
[45] Date of Patent: Sep. 15, 1987

[54] X-RAY DISPERSIVE AND REFLECTIVE STRUCTURES AND METHOD OF MAKING THE STRUCTURES

[75] Inventors: John E. Keem; Stanford R. Ovshinsky, both of Bloomfield Hills; Steven A. Flessa, Southfield; James L. Wood, Westland; Keith L. Hart, Flat Rock; Lennard Sztaba, Hamtranck, all of Mich.

[73] Assignee: Ovonic Synthetic Materials Company, Inc., Troy, Mich.

[21] Appl. No.: 547,338

[22] Filed: Oct. 31, 1983

Related U.S. Application Data

[63] Continuation-in-part of Ser. No. 501,659, Jun. 6, 1983, abandoned.

[51] Int. Cl.⁴ .................. B32B 7/02; G21K 1/06; G02B 1/00
[52] U.S. Cl. .................. 428/333; 350/1.7; 350/166; 378/43; 378/82; 378/84; 427/160; 428/688; 428/704
[58] Field of Search .................. 378/84, 43, 82; 350/1.7, 166, 397, 1.6; 428/620, 627, 641, 333, 913, 433, 434, 688, 704; 427/160, 404

[56] References Cited

U.S. PATENT DOCUMENTS

| | | | |
|---|---|---|---|
| 3,682,528 | 8/1972 | Apfel et al. | 427/160 |
| 3,887,261 | 6/1975 | Spiller | 350/1.6 |
| 4,101,200 | 7/1978 | Daxinger | 428/433 |
| 4,261,771 | 4/1981 | Dingle et al. | |
| 4,495,254 | 1/1985 | Hoffman | 428/434 |

OTHER PUBLICATIONS

Grigorovici, R., "Amorphous Semiconducting Films: Physical Background of Applications," *Applications of Thin Films*, Proceed. Int. Conf. on Thin Films, May 15–19, 1972, Venice, 1972, pub. by Elsevier Sequoia S. A. Lausanne 1972, pp. 153–155.
Spiller, Evaporated Multilayer Dispersion Elements for Soft X-Rays, 1981, pp. 124–130.
Spiller, et al., Controlled Fabrication of Multilayer Soft X-Ray Mirrors, 1980, pp. 1048–1050.
Underwood, et al., Synthetic Multilayers as Bragg Diffractors for X-Rays, 1981, pp. 170–178.
Underwood, et al., Layered Synthetic Microstructures: Properties and Applications in X-Ray Astronomy, 1979, pp. 123–130.
Haelbich, et al., Smooth-Multilayer Films Suitable for X-Ray Mirrors, 1979, pp. 184–186.
Schuller, New Class of Layered Materials, Jun. 16, 1980, pp. 1597–1600.

*Primary Examiner*—Craig E. Church
*Assistant Examiner*—T. N. Grigsby
*Attorney, Agent, or Firm*—John T. Winburn; Lawrence G. Norris; Marvin S. Siskind

[57] ABSTRACT

X-ray dispersive and reflective structures and materials are provided which exhibit improved resolution and reflectivity in specific ranges of interest without substantial fluorescence or absorption edges. The structures are formed of metallic and non-metallic layer pairs and can include a buffer layer between each layer to prevent interdiffusion to stabilize the structures. The materials can be thermally activated to control the desired properties, during or post deposition. The structures can be deposited by ion beam absorption techniques to form the structures in a precise manner. The index of the refraction of the structures can be continuously varying throughout the structures.

20 Claims, 12 Drawing Figures

PRIOR ART

X-RAY DISPERSIVE AND REFLECTIVE STRUCTURES AND METHOD OF MAKING THE STRUCTURES

CROSS REFERENCE TO RELATED APPLICATIONS

This application is a continuation-in-part of U.S. Ser. No. 501,659, filed June 6, 1983, entitled "Improved X-ray Dispersive And Reflective Structures And Method Of Making The Structures" and now abandoned.

BACKGROUND OF THE INVENTION

This invention relates to improved reflectivity and resolution X-ray dispersive and reflective structures and methods of synthesizing the structures. These synthetic structures are free from the constraints of crystalline symmetries and from the restrictive prior art vapor deposition techniques and materials. The improved structures have a substantially constant integral reflection coefficient over specific wavelength ranges of interest, including substantially no fluorescence in each wavelength range. The invention has a wide range of applications for substantially all fields requiring the dispersion and reflection of X-rays, particularly with specific wavelength ranges above 8.66Å, such as crystal analyzers for spectrographic analysis, crystal monochrometers, X-ray laser cavity mirrors, X-ray telescopes and certain X-ray photo lithographic equipment.

Commercial X-ray dispersive structures are formed from crystalline structures such as LiF, metal acid phthalates (map), pyrolytic graphite and Langmuir-Blodgett (LB) films. These materials have very restrictive lattice spacing constraints. In addition, the LB and map devices have severe environmental limitations and must be operated near room temperature in a dry environment. LB devices are not appropriate for very high vacuum applications since under certain conditions they can evolve contaminants. They are also inappropriate for high incident beam energy applications since they can decompose. They have poor mechanical integrity, such as scratch resistance, mechanical breaking strength and resistance to abrasion. Further, all of the prior structures have lower reflectivities than desired.

Numerous attempts to construct both natural and new crystalline analogue materials have been made with the aim of extending the X-ray properties heretofore limited by the availability of natural crystalline materials. One such attempt is compositional modulation by molecular beam epitaxy (MBE) deposition on single crystal substrates. For example, in Dingle et al., U.S. Pat. No. 4,261,771, the fabrication of monolayer semiconductors by one MBE technique is described. These modulated prior art structures are typically called "superlattices." Superlattices are developed on the concept of layers of materials forming homo or hetero epitaxially grown planes or film layers resulting in a one-dimensional periodic potential. Typically, the largest period in these superlattices is on the order of a few hundred Angstroms; however, monatomic layered structures have also been constructed.

The superlattices can be characterized by the format of a number of layer pairs formed by a layer of A (such as GaAs) followed by a layer of B (such as AlAs), etc.; formed on a single crystal synthetic material with good crystalline quality and long range order. The thickness of each layer pair (A and B) is defined as the "d" spacing. These structures are not appropriate for most reflective or dispersive structures due to the small electron density contrast between the layers. These structures being essentially single crystals with extra super lattice periodicities also suffer from restrictive d spacing, associated with the constraint that the entire structure be a single crystal.

In addition to the MBE type of superlattices construction techniques, other researchers have developed layered synthetic microstructures (lsm) utilizing other forms of vapor deposition, including diode and magnetron sputtering, reactive gas injection and standard multisource evaporation. The layer dimensions are controlled by shutters or moving the substrates relative to the material sources or with combinations of shutters and relative motion. In the case of multisource evaporation, the required thickness control is achieved by monitoring the X-ray reflectivity of the film in situ as the deposition is being made. The materials reported have been formed from crystalline layers, noncrystalline layers and mixtures thereof; however, generally the efforts so far reported are directed at the synthesis of superlattice-type structures by precisely reproducing the deposition conditions on a periodic reoccurring basis. Some of the structures have graded d spacing through the structure.

These materials can be thought of as synthetic crystals or crystal analogues in which it is defined as crucial that the long range periodicity or repetition of a particular combination of layers be maintained. These structures are both structurally and chemically homogeneous in the x-y plane, and are periodic in the third (z) direction. These construction approaches particularly sputtering, can utilize a greater variety of materials than evaporation. The d spacing in a structure can be graded throughout the structure to provide some reflectivity for a range of X-ray wavelengths, but they do not achieve optimum control of higher order reflections and the deposition precision is not as good as desired. This results in interfaces and layer thicknesses which are not as precise as desired for certain applications. While smoothing of the underlying substrate or layers has been reported as multiple layers are deposited, the minimum smoothness reported has been about 1.4 to 1.8Å. Also, the minimum reported d spacing for any significant reflectivity has been above 15Å. One desired goal in producing high efficiency X-ray reflectors is to produce a maximum contrast in electron density across the most precisely defined interface which produces the greatest number of orders of reflection. Further, the smoothness of the layer surfaces must be as precise as possible to minimize scattering caused by the surface variations.

Prior attempts at utilizing these structures for X-ray applications relied on the use of carbide low density layers between high electron density metal layers for making high reflectivity structures for the soft X-ray region. Other elements that have been suggested for the low electron density layers and in some cases utilized are boron and beryllium. The combinations actually utilized have been layers of W:C and ReW:C. Although these elements do provide high electron density contrast, they suffer from a very great disadvantage, that is they all have absorption edges which limit the X-ray range in which these structures are to be employed.

SUMMARY OF THE INVENTION

The disadvantages of the prior art are overcome by improved reflectivty and resolution X-ray dispersive and reflective structures and materials. The structures exhibit enhanced reflectivity and resolution in specific soft X-ray wavelength ranges of 8.66Å and greater which are at least one third of the theoretical integral reflection coefficient for layered structures over the specific range. The structures are formed of material which have a minimum difference in electronegativity, atomic radius and bond length to optimize the ability to control interfacial characteristics. The structures include alternating layers of metallic and non-metallic materials. The potential of the non-metallic material layer interacting with the metallic layer can be controlled by utilizing an interfacial buffer layer between the layers.

The structures can be formed to exhibit ultrasmooth layer interfaces having a root mean square roughness less than 1.4Å and can have d spacings of less than 15Å. The materials have reflectivity and resolution better than or equal to those of the prior art, but by the appropriate materials choice and construction they also have no substantial fluorescence and no substantial absorption edges to degrade the performance of the reflectors and/or dispersive elements in each specific X-ray range of interest.

The structures can be thermally activated to increase first order reflectivity, during or post deposition, and to change or control the reflectivity. The structures also can be annealed at high temperature to provide further control of the reflectivity of all orders of reflection.

The X-ray dispersive structures also can have a controllable essentially continuously varying index of refraction. The continuously varied refractive index structures can be formed by an improved ion beam deposition technique, which can also be utilized to form the layered synthetic microstructures in a more precise manner. The ion beam system is utilized to deposit amorphous materials to precisely control the electron density as a predetermined function throughout the structure.

The X-ray dispersive and reflective structures can be formed from magnetic materials and can be formed onto substantially cylindrical substrates. The ion beam technique can include a two ion beam system and one beam can be a reactive ion beam utilizing reactive gases.

DESCRIPTION OF THE PREFERRED EMBODIMENTS

FIGS. 1 through 11 describe the prior art and the system, materials and structure described and claimed in the parent application, U.S. Ser. No. 501,659. The applicability of the parent disclosure to the present invention is described therewith and the new materials and structures of the present invention are described with respect to FIG. 12 and the tables and text thereafter.

Figure 1:
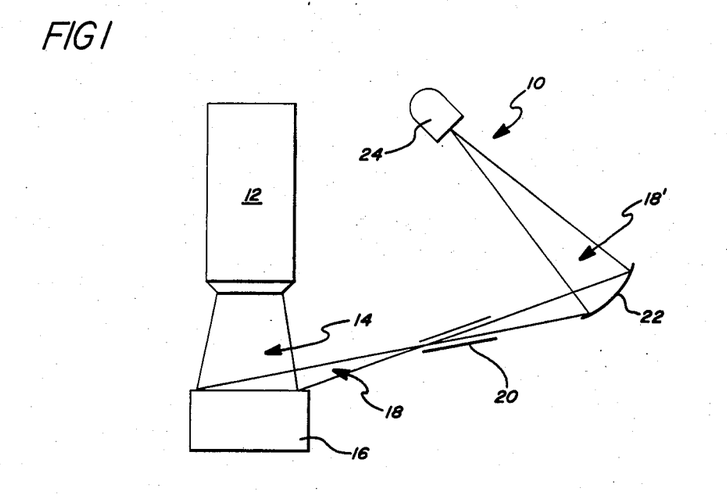
FIG. 1 is a partial diagrammatic representation of one embodiment of X-ray analysis system which can utilize the X-ray dispersive structures of the invention.

Referring to FIG. 1, there is shown a diagrammatical representation of a conventional X-ray analysis system 10. The system 10 includes an X-ray source 12 which directs a beam of X-rays 14 at a sample 16. A beam 18 of fluorescent radiatiation is emitted by the sample 16 which is aligned to pass through an aperture 20 onto an X-ray dispersive structure 22 which reflects a beam 18' to a detector 24. The curvature of the structure 22 is exaggerated, but it is slightly curved to focus the desired wavelengths of the reflected beam 18' onto the detector 24.

Figure 2:
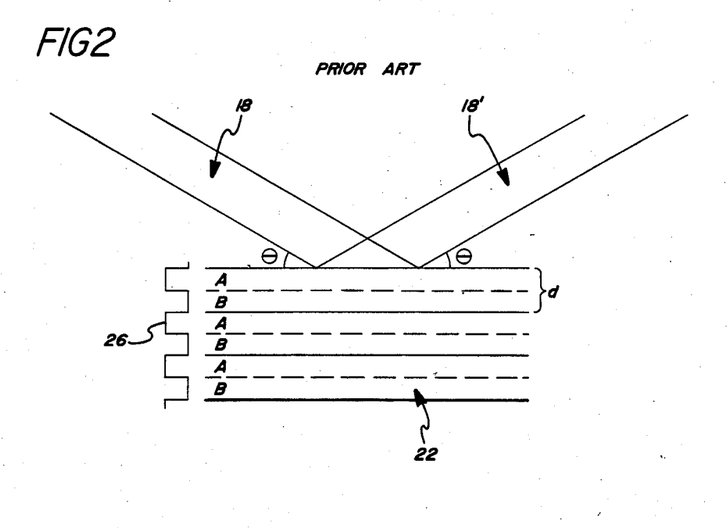
FIG. 2 is an exploded partial sectional view of a prior art X-ray dispersive structure illustrating the X-ray dispersive pattern.

FIG. 2 shows the dispersion pattern of a typical prior art layered structure 22. While only three layer pairs have been shown, having a layer spacing d, typically many layer pairs are utilized for example on the order of 100–2000. The incident beam 18 is made up of a band of wavelengths, $\lambda$ being an example of one wavelength. The reflected beam 18' is made up of a substantially single wavelength $\lambda$ reflected at angle $\theta$, approximately according to Bragg's law $n\lambda' = 2d \sin \theta$. This condition is also satisfied for all subharmonics of $\lambda'$, i.e. $\lambda'/2$, $\lambda'/3$ ... $\lambda'/n$. Therefore, the reflected beam 18' contains all of these wavelengths in proportion to both their intensity in the incident beam and the magnitude of the higher orders of reflection which result from the rectangular electron density distribution, as illustrated in FIG. 2. $I_i(\lambda)$ is the incident intensity distribution of $\lambda$ and $I_r(\lambda')$ is the reflected intensity distribution of $\lambda'$. (A full theoretical treatment results in a modification of Bragg's law resulting from refraction of the X-ray beam.)

Each layer pair contributes to the reflected beam intensity at a like angle. The reflection from only one layer pair is illustrated. The structure 22 generally is curved to focus the reflected wavelength of interest from each layer pair onto the detector 24. The structure 22 is formed from a plurality of layers, each layer of which includes a pair of different material layers A and B which is intended to have an abrupt junction between each layer. Functionally, this means there essentially is a square wave density or reflection index 26 which intercepts the beam 18.

Figure 3:
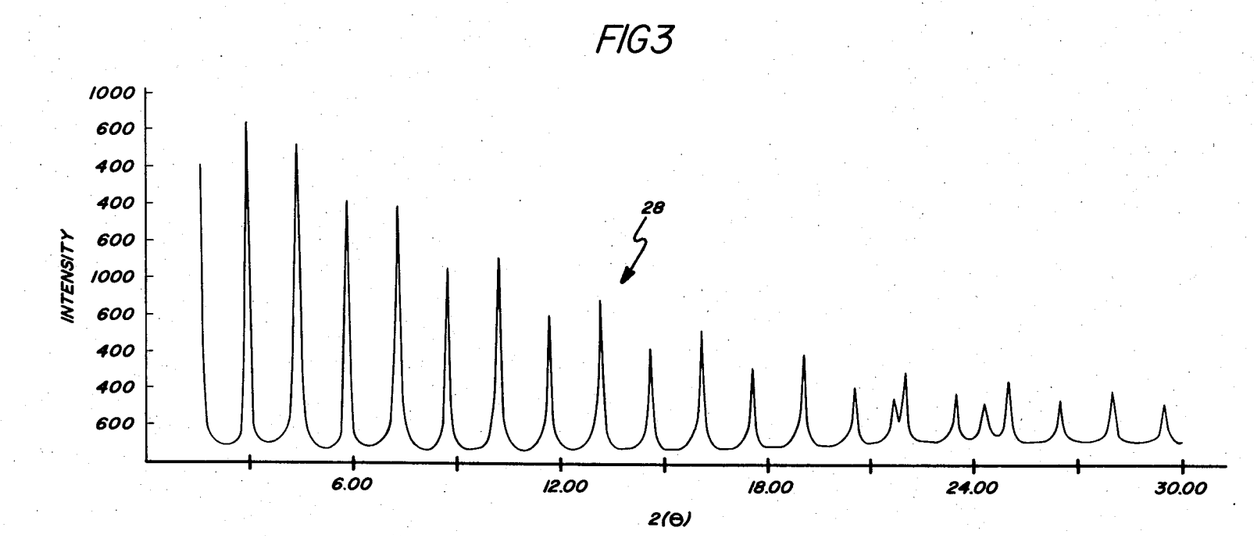
FIG. 3 is a diffraction pattern generated by the prior art structure of FIG. 2.

FIG. 3 illustrates a diffraction pattern 28 caused by the incident beam 18 impinging on a prior art LB X-ray dispersive structure. Each of the peaks is an order of reflection, n, for the wavelength λ (the wavelength of interest) as derived according to the approximate relationship $n\lambda' = 2d \sin \theta_n$. The prior art lsm devices exhibit similar diffraction patterns, which essentially are controlled by the materials deposited and the d spacings utilized. It would be desirable to control the diffraction pattern, by more precise control of the layered structures and to eliminate any substantial fluorescence and absorption edges in the specific X-ray ranges of interest as described hereinafter.

Also, it can be desirable to reflect all the incoming beam energy at wavelength λ at a single angle. This would substantially increase the intensity of the reflected wavelengths at each corresponding angle and simplify the analysis of the diffracted beam and hence the chemical composition of the sample. Another application is for monochromators.

Figure 4:
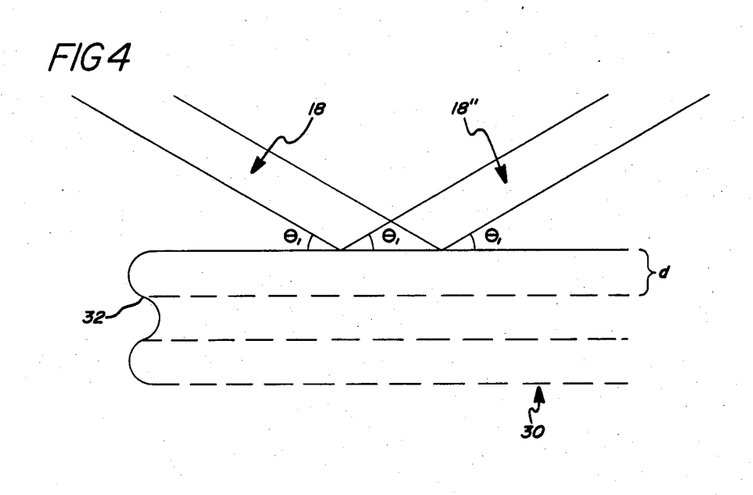
FIG. 4 is ah exploded partial sectional view of one embodiment of the X-ray dispersive structure of the invention illustrating the X-ray diffraction pattern.

FIG. 4 illustrates one desired diffracted beam pattern 18″ from a dispersive structure 30 which can utilize the materials of the invention which reflects all the incident beam energy of a particular wavelength at separate angles, for example λ, at $\theta_1$. All different wavelengths including subharmonics of the wavelength of interest would be reflected at different angles. The structure 30 is formed by the techniques described below, to result in a substantially continuously varying electron density or refractive index 32. A sinusoidal refractive index is necessary to produce a single diffraction angle for each incident wavelength. Although a d spacing is also shown here, the materials such as C and D are materials whose compositions vary essentially sinusoidally in composition throughout the structure, such as amorphous alloys. This sinusoidal variation of the maximum electron density contrast through the structure 30 produces a structure with the greatest percentage of radiation in the first order reflection.

Figure 5:
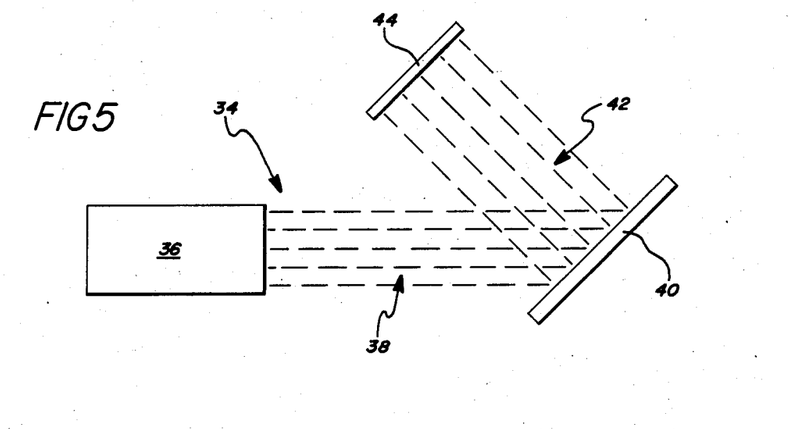
FIG. 5 is a partial side view diagrammatical representation of one embodiment of ion beam deposition technique which can be utilized in forming the structures of the invention.
Figure 6:
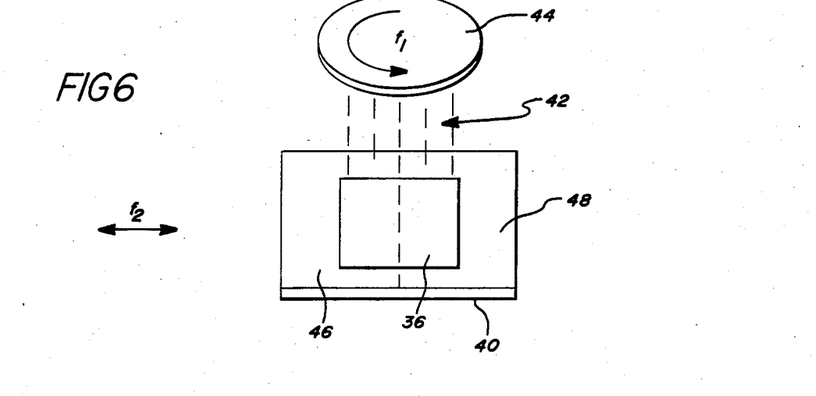
FIG. 6 is a partial end view diagrammatical representation of the technique of FIG. 5.

In order to control the exact composition and microstructure as a function of thickness through the dispersive structures 30, it is necessary to control the magnitude of the kinetic energy of the deposited atoms and their incident momenta. These deposition parameters are best controlled by depositing the materials in an ion beam system to accurately control the average electron density as a function of position throughout the structure. One embodiment of a suitable ion beam system 34 is illustrated in FIGS. 5 and 6.

Ion beam techniques have not been utilized to deposit prior X-ray dispersive and reflective structures, but the techniques as adapted by the parent application are desirable due to their precision and control of the deposition parameters as well as the decoupling of the ion plasma from the substrate and minimization of undesirable components in depositing the desired structure. An ion source 36 generates a beam of ions 38 which are neutralized and directed at a suitable target 40. The beam 38 sputters material from the target 40 into a substantially collimated and uniform stream 42 which is deposited on a suitable substrate 44. The substrate 44 can be mounted on a holder (not shown) and the system 34 is under vacuum which can be substantially lower than that utilized in magnetron or diode sputtering. The substrate 44 also can be heated or cooled as desired to affect the structure of the material deposited as described hereinafter.

Because of the precision of the ion beam system 34, the layers can be produced with a smoothness below 1.4Å. One structure was formed of 30 layer pairs of W and C with a d spacing of 33.5Å and a nominal composition of $W_{50}C_{50}$. The rms roughness Δd (or smoothness) was 0.93Å as defined by:

$$\frac{I_r}{I_i} = \frac{(I_r) e^{-(2\pi n \Delta d/d)^2}}{(I_i) \text{ideal}}$$

The precision and smoothness of the layer interfaces directly affects the reflection pattern. The structure was deposited at room temperature, at a pressure of $1 \times 10^{-4}$ torr, with argon flowing into the gun 36 at 2.8 sccm and the density of the beam 38 at 10 ma/cm². The best reported rms roughness for a prior art lsm structure is for W:C and is about 1.4Å.

As best illustrated in FIG. 6, the ion source 36 preferably is a square cross section source which generates a substantially square section beam 38. The substrate 44 preferably is rotated at a frequency $f_1$, to ensure an even deposition across the substrate 44, preferably in the range of 10-20 rpm. The target 40 is divided into two sections 46 and 48, each formed from a different material, C and D as described above. To form the rectangular electron density structures, the source can be turned off while the target is translated or it can be shuttered to effect the complete separation of the material layers. While, the source 36 and substrate 44 could be oscillated back and forth in a controlled manner to generate the continuously varying index of refraction 32, preferably the target is oscillated in front of the beam 38 at a frequency $f_2$. As utilized herein, frequency is defined as a prescribed rate of repetitions of relative orientations and is not limited to sinusoidal repetitions.

The frequency $f_1$ preferably is much greater than the frequency $f_2$, for example on the order of 100 times $f_1$. For different materials and structures $f_1$ and $f_2$ will be different and section 46 might be passed in front of the beam 38 at a different rate or with a different beam power than section 48. Further, the sections 46 and 48 can be separate targets and there can be more than two sections, which also can be controlled by shutters (not shown) if desired.

The materials on the target 48 can be in more than two sections and, for example, can be four sections which can be deposited in two sets of layer pairs, A and B and C and D. The two sets can be selected such that two different wavelengths of interest, $\lambda_1$ and $\lambda_2$, are both reflected at the same angle to the detector 24 or to different detectors. Single element materials, compounds, alloys or combinations thereof can be utilized.

Figure 7:
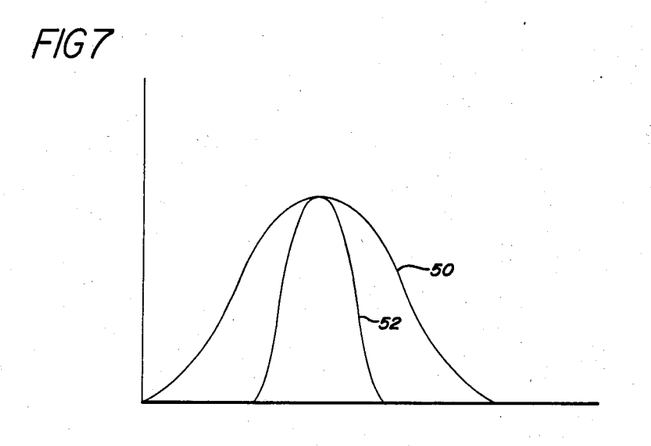
FIG. 7 is a diagram of reflected wavelength resolution.

FIG. 7 is a diagram illustrating the reflected wavelength resolution. The more narrow the bandwidth, the more resolution is obtained from the reflected signal, hence a reflected bandwidth 50 has much less resolution than the same reflected signal with a bandwidth 52. The precision of the system 34 can result in a much more narrow reflected bandwidth than the prior lsm type of X-ray structures 22.

Figure 8:
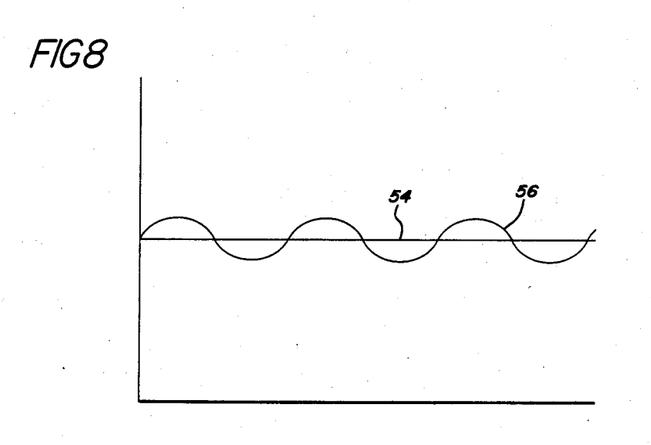
FIG. 8 is a diagram of controlled bandwidth of the reflected signal.

FIG. 8 illustrates another advantage of the deposition techniques of the parent application which are applicable to the present invention. Since amorphous materials are not limited to any one structure, utilizing the deposition techniques of the invention the maximum and minimum electron density contrast for each layer can be varied as desired. In the prior lsm structures 22, material A is alternated with material B, and hence the electron density is limited to a pseudorectangular distribution. Further, a maximum reflectivity 54 can be chosen with a minimum deviation 56 of reflected bandwidths around the maximum 54.

Figure 9:
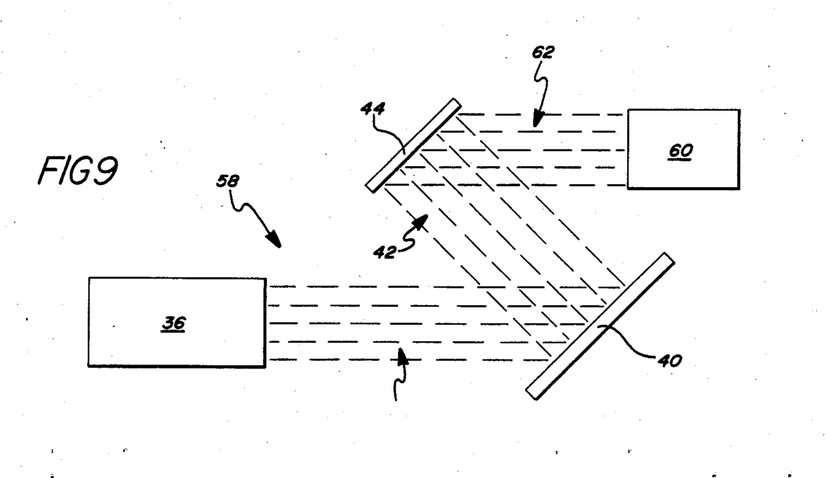
FIG. 9 is a partial diagrammatical representation of a second embodiment of the ion beam deposition technique which can be utilized in forming the structures of the invention.

FIG. 9 illustrates a second ion beam system 58, which can be identical to the system 34 with the addition of a second ion beam source 60. The ion beam source 60 generates an ion beam 62 which can be a reactive ion beam formed from argon and/or nitrogen or other suitable materials and combinations thereof. A reactive ion beam can be utilized to control the density of the materials in a selected layer or layers or in all layers. The substrate 44 is again rotated at a speed $f_1$ and the target 40 is oscillated in front of the beam 38 at a frequency $f_2$. The current of the reactive beam 62 can be controlled at a third frequency $f_3$ to modulate and assist in the deposition of the material onto the substrate 44. The ion current of the ion source 36 also can be varied at a fourth frequency $f_4$, to provide a further control of the deposition process.

Figure 10:
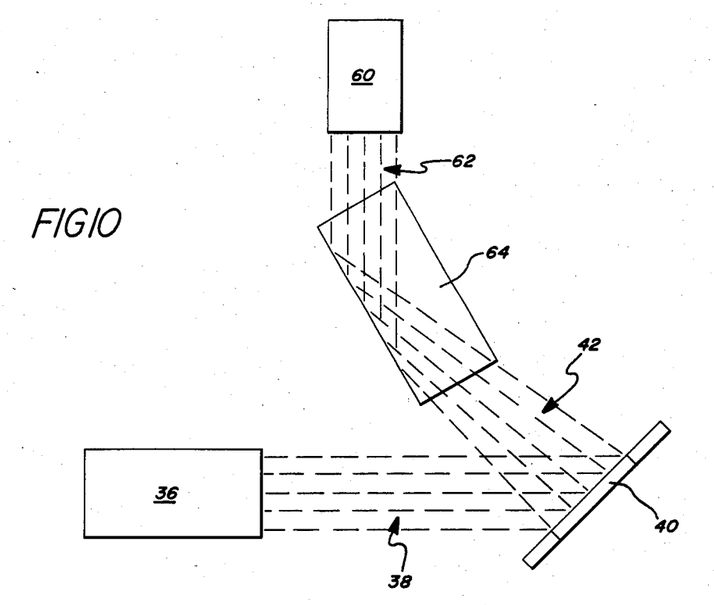
FIG. 10 is a partial diagrammatical representation of the techniques of FIGS. 5 and 9 utilized to deposit on a cylindrical surface.

The deposition systems of the parent application can also be utilized to deposit the dispersive or reflective structures of the invention onto the inside of a substantially curved or cylindrical substrate 64, as illustrated in FIG. 10. The substrate 64 can be coated by the stream 42 or by both the beam 62 and stream 42. The reactive source alignment is not crucial and the source 60 can also be aligned to enter the cylinder from the same direction as the stream 42. The substrate 64 would again be rotated at a frequency $f_1$ to provide a uniform deposition and the frequency of the target 40 is selected as previously described.

Figure 11:
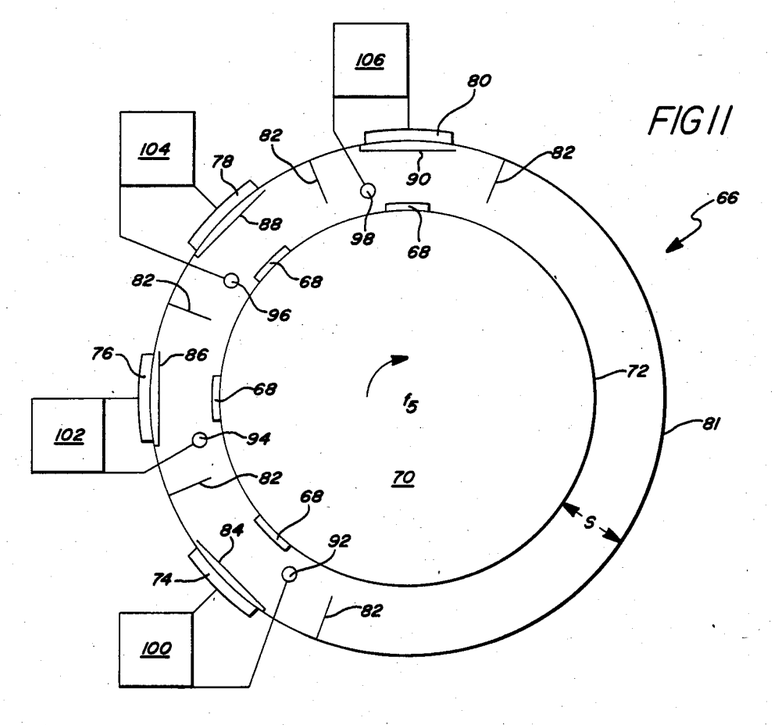
FIG. 11 is a partial diagrammatical representation of a third deposition technique which can be utilized in forming the structures of the invention.

A third type of deposition system 66 is illustrated in FIG. 11. The system 66 is a magnetron sputtering deposition system which confines the plasma to the vicinity of a plurality of target 74, 76, 78 and 80 separated from a plurality of substrates 68 fixed to a rotating drum 70. The outer surface of the drum 70 also could be utilized as a substrate 72 if desired. The drum 70 can be heated or cooled as desired and is rotated at a frequency $f_5$ to pass the substrate 68 past a plurality of targets 74, 76, 78 and 80 mounted on a shell 81 of the system.

Each target 74, 76, 78 and 80 is isolated by a variable height isolation shield 82. Each target 74, 76, 78 and 80 has associated therewith a shutter 84, 86, 88 and 90, a deposition rate monitor 92, 94, 96 and 98 which is coupled to a respective power supply 100, 102, 104 and 106. Each target thus has its own power supply, shutter and deposition monitor to provide a control loop at each deposition station. Although four stations have been illustrated, more or less can also be provided.

The space "S" between the drum surface 72 and shell 80 is varied to control the impact of the secondary electrons on the substrate to maximize the decoupling of the magnetron confined plasma from the substrates to provide a more uniform and controlled deposition. The system 66 is operated under vacuum with a sputtering gas such as argon. In addition, a reactive gas, such as hydrogen or a compound containing hydrogen, can be injected into the plasma adjacent the target for the effects described above. The system can make many substantially identical modulated structures on the plurality of substrates 68 or can make a single structure on the cylinder 72.

The present invention also includes the choice of the most appropriate materials which can take full advantage of the improved synthesis techniques above described in specific wavelength ranges of interest. It has been previously known that the reflectivity properties of lsm devices can be controlled by controlling the electron density as a function of depth in the lsm device. For example, to obtain the maximum reflectivity it is known that the constituents should be chosen with the maximum electron density differences between the layers. Hence the dominant choice in the prior art lsm devices has been W:C or W-Re:C layers.

Additional factors which are important in achieving the maximum control over the composition gradients in the structures of the parent application and the present invention are relative electronegativities, atomic diameters and bond lengths. A smaller difference in electronegativities means that there is less of a tendency for these materials to react when they are placed by deposition processes into adjacent layers. It is for these reasons that the materials that have the smallest electronegativity difference and the greatest electron density difference should be utilized to synthesize structures with the highest peak reflectivity. From a geometric point of view, the greater the similarity between atomic sizes and bond lengths the more effectively these materials can be mixed and layered in a precise prescribed fashion.

We observe that in the prior art lsm structures constructed from tungsten and carbon, the Pauling electronegativities are 1.7 and 2.5, respectively. Additionally, the covalent radii are 1.3 and 0.77Å and the bond lengths are 2.74 and 1.54Å, respectively. It has been published that the tungsten carbon prior structures when deposited by sputtering do not layer as tungsten and carbon, but rather as tungsten carbide and carbon. The chemical reactions which occur at the interfaces between the W and C constituents are partially controlled by these chemical and physical mismatches and thereby make difficult the construction of perfectly controlled interfaces.

To synthesize structures with the maximum precision, the materials of the parent application were chosen so that there is a minimum electronegativity difference between the species involved and the closest similarity in covalent radii and the minimum distance in bond length (including M-M bond lengths, non-M and non-M bond lengths and non-M and M bond lengths). The Pauling electronegativities for Hf and Si materials are 1.3 and 1.8, respectively for the metal (M) and the nonmetal. In addition to being concerned about how well the layering and maximizing the electron density contrast can be controlled, it is also necessary that the materials that are used not have spurious fluorescences which would reduce the signal to noise ratios in spectroscopic applications. When this fact is also included in the requirements for a material to be a reflecting/dispersive element, the most correct pairs of materials are hafnium:silicon, rhenium:silicon or Hf-Re:Si for the total wavelength range of 9.75Å to 120Å specified in the parent application. Utilizing the concepts of the parent application in the magnetron sputtering system, a structure formed from layers of Hf and Si was deposited which had a d spacing of 7.85Å. The layers were deposited at room temperature with 2 microns background pressure in argon.

As stated above, the other features which are important in controlling the quality of the layered structures include the atomic diameters of the materials and the bond lengths of the separate elements between themselves. Using the criterion that the atomic size and the bond lengths of the high and low electron density materials be as similar as possible results in the choice of silicon as the nonmetal and Hf, Re or Hf-Re alloys as the metallic higher electron density material in the layered structures for use in the total soft X-ray range of the parent application. The bond lengths of Hf and Si are 3.13 and 2.35A, respectively. The covalent radii of hafnium, rhenium and silicon are 1.44Å, 1.28Å and 1.11Å, respectively.

The other nonmetals which might be considered are carbon, boron, and beryllium. All of these elements have bond lengths of about 1.5Å. Thus these alternative light elements would cause a very large mismatch in atomic sizes and bond lengths at the interfaces making optimum control of the structure more difficult. As stated before the electronegativities of boron and carbon are greater than those of the optimum metals, thus destabilizing the structures toward compound formation, and of course all of these light elements will fluoresce when used as soft X-ray spectrometers and mirrors in the total range of 9.75 to 120Å specified in the parent application.

Using these same principles, a material which would give optimum structures for highest resolution dispersive structures must be compatible from the chemical point of view and in addition have a small electron density contrast, as well as no substantial fluorescence. Aluminum-magnesium:silicon, Al:Si or Mg:Si, structures would be the most appropriate for the use as high resolution soft X-ray devices. The covalent radii for Al and Mg are 1.18 and 1.36Å, the bond lengths are 2.86 and 3.19Å and the Pauling electronegativities are 1.5 and 1.2, respectively.

For devices to be used in the harder X-ray region this same analysis must be carried out, but with different fluorescence limitations on the X-ray structures.

One example of a specific Langmuir-Blodgett X-ray film which can be replaced by the structures of the parent application is a Myristate film. The structure in accordance with the parent application was formed from 50 layer pairs of Hf and Si by magnetron sputtering at room temperature in argon with 2 microns background pressure. The nominal composition was about $Si_{60}Hf_{40}$. The comparison for O K $\alpha$ and N K $\alpha$ reflections are shown in Table 1.

TABLE 1

|   | Hf:Si Structure $I_p$ | Myristate $I_p$ |
|---|---|---|
| O | $1.24 \times 10^5$ | $3.38 \times 10^4$ |
| N | $1.16 \times 10^4$ | $2.36 \times 10^3$ |

The present structure was more than 3.6 times better than the Myristate for O K $\alpha$ and more than 4.9 times better than the Myristate for N K $\alpha$ detection. These measurements were made in a JEOL WDS Spectrometer by standard techniques under substantially identical operating conditions for each test. The Hf:Si structure had a d spacing of 42Å and the Myristate had a d spacing of 40Å. Part of the large difference is due to the lack of the C absorption edge in the Hf:Si structure. The Hf:Si structure exhibits a substantially constant reflectivity over the total soft X-ray range of interest. The prior structures, both LB and lsm structures which include C, in contrast fall below one third of the theoretical intensity at the C absorption edge at approximately 43.7Å. Significant changes in the reflection intensity have been observed by annealing the structures for times as short as one hour at 100° C.

The structures of the present invention also can be thermally activated to control various desired parameters in the resulting structures. An increase in first order reflectivities can be obtained by post annealing the structures. A Hf:Si structure of the parent application was deposited in a magnetron sputtering system in argon with 2 micron background pressure at room temperature. The structure had a nominal composition of $Hf_{40}Si_{60}$, 100 layer pairs and a d spacing of 34.4Å. The deposited structure was annealed at 200° C. for sixty-three hours which increased the reflection intensity $(I_r/I_i)$ in the first three orders of reflection as shown in Table 2.

TABLE 2

|   | 1st order | 2nd order | 3rd order |
|---|---|---|---|
| As deposited | 70.5 | .40 | .06 |
| After annealing | 72.5 | .44 | .41 |

A second method of tuning the reflectivity is illustrated in Table 3. These were all Hf:Si structures of the parent application deposited in the magnetron sputtering system under the same general conditions as previously described, with the exception that the substrate temperature was varied as described. The structures again had a nominal composition of $Hf_{40}Si_{60}$, 00 layer pairs and a d spacing of 38.8Å.

TABLE 3

| Substrate Temperature | First Order Reflectivity |
|---|---|
| 50° C. | 53.7 |
| 100° C. | 75.7 |
| 200° C. | 70.0 |

Table 4 illustrates the use of thermal activation to decrease the first order reflection and to increase the second order reflection. This principle can be utilized for structures where the first order is reflected at too small an angle to be effective. The Hf:Si materials of the parent application were deposited in the magnetron sputtering system under the previously described conditions at room temperature. Both structures had a nominal composition of $Hf_{40}Si_{60}$ and 100 layer pairs. The first had a deposited d spacing of 32.13Å and the second a d spacing of 33.21Å. The first structure was annealed at 300° C. for 1 hour and the second at 400° C. for 1 hour.

TABLE 4

|   | First Order | Second Order |
|---|---|---|
| #1 Before Anneal | 77.8 | .28 |
| After Anneal | 13.8 | .60 |
| #2 Before Anneal | 56.0 | .26 |
| After Anneal | 49.6 | 1.10 |

The parent application stated that for the total soft X-ray range that, while the utilization in the layered structures of C, W and Be as well as other elements as major constituents, produce undesirable absorption edges and/or fluorescence, small amounts of the materials can be useful. The addition of small amounts of C, W or Be such as in Hf:Si-C structures or W-Re-Hf:Si-C structures can be useful, because reflectivity increases as the electron density difference increases. The C or Be would replace some of the Si while the W will replace some of the Re-Hf alloy. This can result in at least two desirable effects, one is an increase in intensity at wavelengths of interest away from the absorption or fluorescense edges and a second by increasing the overall stability of the structures. Other material combinations also could be formed including alloy: alloy layer pairs, alloy:Si or alloy: Si:H layer pairs, Hf-Re:Si layer pairs or Hf-Re:Si-H alloy pairs.

In addition to C or Be, boron also can be utilized in small amounts to replace some of the Si in the structures of the parent application for the same effects as C or Be. Further, in accordance with the present invention, C and boron can be utilized as major constituents of the structures of the present invention.

Figure 12:
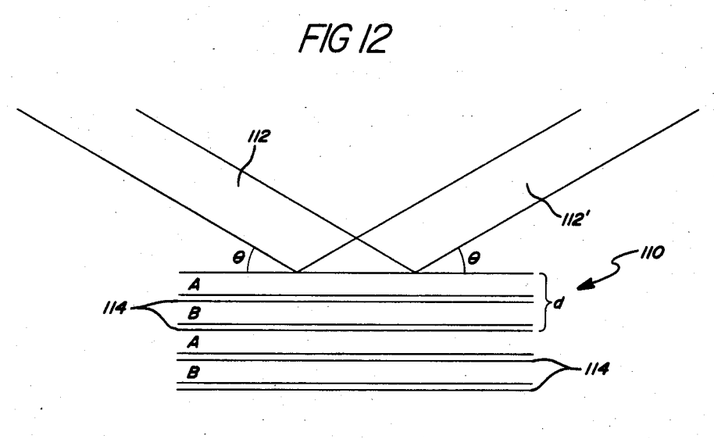
FIG. 12 is an exploded partial sectional view of one embodiment of the X-ray dispersive structure of the invention with an interfacial buffer layer formed therein.

One embodiment of a structure 110 of the present invention is best illustrated in FIG. 12. As previously described with respect to FIG. 2, an incident beam 112 is reflected by the layer pairs of the structure 110 to form a reflected beam 112'. In addition to different materials A and B forming each of the layer pairs, an interfacial buffer layer 114 is formed between each layer pair. The layer 114 can be formed of one or more atomic layers of Si having a thickness in the range of 1.3 to 5Å. The layer 114 is thick enough to provide control of the interaction or interdiffusion of the material layers A and B to stabilize the structure 110, but not thick enough to adversely affect the absorption coefficient of the structure. This provides a wider range of material compositions and thicknesses for the structures while still enabling good manufacturing yields. The two thicknesses of the layer 114 are also included with the thickness of the layers A and B to determine the effective d spacing, i.e., 114, A, 114 and B.

The layer 114 can be utilized to permit the construction of devices 110 of the invention including layers of carbon, boron or $B_4C$. This provides devices which have a higher electron density contrast than structures with a Si layer A or B since boron and C have smaller electron densities than Si. The buffer layer 114 can also be formed of Ge or GeSi or other substantially covalent bonding elements and alloys which are substantially consistent with the physical and chemical properties which substantially meet the requirements of an inert buffer layer between the metallic and nonmetallic layers. The layer 114 is not totally essential with boron or $B_4C$ layer structures, but does improve the structures especially for small effective d spacings. Carbon is more reactive by itself and the layer 114 substantially improves the ease of manufacturing and the resulting properties for C layer structures.

The higher electron density contrast of these carbon and boron including structures provides an increase in reflectivity and resolution for specific X-ray wavelength ranges of interest, which generally are subranges of the total soft X-ray range of 9.75 to 120Å prescribed in the parent application. The prior art describes structures formed of layer pairs A and B of W:C and ReW:C. The present invention includes structures including carbon and boron for the limited ranges set forth below. In addition, for the X-ray range of 8.99 to 54Å, a W:Si layered structure also has improved properties over the Hf:Si structure of the parent application.

One example of a specific Langmuir-Blodgett X-ray film which can be replaced by the structures of the present application is a Myristate film. The structure was formed from 200 layer pairs of W and Si by magnetron sputtering at room temperature in argon with 2 microns background pressure. The nominal composition was about $W_{30}Si_{70}$. The comparison for O K $\alpha$ and N K $\alpha$ reflections are shown in Table 5, with the Hf:Si results from Table 1.

TABLE 5

|   | W:Si Structure $I_p$ | Hf:Si Structure $I_p$ | Myristate $I_p$ |
|---|---|---|---|
| O | $1.92 \times 10^5$ | $1.24 \times 10^5$ | $3.38 \times 10^4$ |
| N | $2.00 \times 10^4$ | $1.16 \times 10^4$ | $2.36 \times 10^3$ |

The present structure was more than 5.6 times better than the Myristate for O K $\alpha$ and more than 8.4 times better than the Myristate for N K $\alpha$ detection. All the structures were curved like structure 22 in FIG. 1. These measurements were made in a JEOL WDS Spectrometer by standard techniques under substantially identical operating conditions for each test. The peak intensity ($I_p$) is measured in counts per second per microamp of beam current. The W:Si structure had a d spacing of 38.5Å, the Hf:Si structure had a d spacing of 42Å and the Myristate had a d spacing of 40Å. Part of the large difference is due to the lack of the C absorption edge in the W:Si and Hf:Si structures.

An example of a specific curved Langmuir-Blodgett X-ray film which can be replaced by curved structures of the present application is a Myristate film. The structures, curved like structure 22, FIG. 1, in accordance with the present application were formed from 200 layer pairs of Hf and Si by magnetron sputtering at room temperature in argon with 2 microns background pressure. The nominal compositions were about $Si_{60}Hf_{40}$. The comparison for C, N and O K $\alpha$ reflections are shown in Table 6.

TABLE 6

|   | Si:Hf Structure $I_p$ | Myristate $I_p$ |
|---|---|---|
| C-1 | $7.19 \times 10^4$ | $3.38 \times 10^4$ |
| C-2 | $5.13 \times 10^4$ | $3.75 \times 10^4$ |
| N-1 | $4.74 \times 10^3$ | $1.44 \times 10^3$ |
| N-2 | $5.37 \times 10^3$ | $1.74 \times 10^3$ |
| O | $1.09 \times 10^5$ | $1.98 \times 10^4$ |

The present structures were substantially better than the Myristate for C K $\alpha$ more than 3 times better than N K $\alpha$ and more than 5 times better for O K $\alpha$ detection. These measurements were made in a JEOL WDS Spectrometer by standard techniques under substantially identical operating conditions for each test as described above. The Hf:Si structures had respective d spacings of 30Å for C-1, 39Å for C-2, 29Å for N-1 and N-2 and 39Å for O. The Myristate had a d spacing of 29Å for C-1 and 40Å for C-2, N-1, N-2 and O.

Carbon has a strong absorption edge and limits the C layered structures having improved reflectivity to a range of 8.66 to 43.7Å. These would include, generally with but also without the buffer layer 114, Hf:C, HfW:C, Re:C and HfRe:C The intermetallic compound $B_4C$ does not have as strong an absorption edge as does C and permits improved reflectivity structures to be formed for utilization in the range of 8.66 to 66.0Å. The B and C ratio is substantially 4:1 and the structures are most useful up to the boron absorption edge. These would include, with and without the buffer layer 114, $Hf:B_4C$, $W:B_4C$, $Re:B_4C$, $HfW:B_4C$, $HfRe:B_4C$ and $HfWRe:B_4C$.

All of these structures are most useful for analysis of radiation with an energy greater than B K $\alpha$ and the ranges specified are also out of the major interference range of B fluorescence.

Another example of a specific Langmuir-Blodgett X-ray film which can be replaced by the structures of the present invention is an LOD (lead octadeconate) film, especially for C, N, O and B K α reflections, i.e., a specific range of 23.6 to 67.6Å. The structures were formed from 200 layer pairs of W and Si by magnetron sputtering at room temperature in argon with 2 microns background pressure. The nominal compositions were about $W_{30}Si_{70}$ with a range of 25-35% W and 75-65% Si. The comparison for the peak intensity in counts per second for the Mg, O and F K α reflections are shown in Table 7.

TABLE 7

|      | W:Si Structure | LOD |
|------|----------------|-----|
| Mg-1 | 1250           | 179 |
| Mg-2 | 930            | 179 |
| O-1  | 34             | 6   |
| O-2  | 31             | 6   |
| O-3  | 34             | 6   |
| O-4  | 34             | 5   |
| F    | 860            | 370 |

The structures of the invention were more than 5 times greater than the LOD film for Mg K α for two d spacings. The two structures had respective d spacings of 25Å for Mg-1 and 40Å for Mg-2. The structures of the invention were more than 5 times greater than the LOD film for O K α for three d spacings and 17 times better for 1 structure. The three W:Si structures had respective d spacings of 35Å for O-1, 45Å for O-2, 65Å for O-3 and 50Å for O-4. One structure of the invention was more than 2 times greater than the LOD film for F K α for a d spacing of 25Å. The LOD film had a d spacing of 50Å. These measurements were made in a Philips Vac-Spec with flat structures under substantially identical operating conditions for each test as previously described. Part of the large difference is due to the lack of the C absorption edge in the W:Si structure.

An example of a specific map (metal acid phthalate) crystal which can be replaced by the structures of the present invention is a TAP (thallium acid phthalate) crystal, especially for Mg, Na and F K α reflections, i.e., a specific range of 9.89 to 18.30Å. The structure were formed from 200 layer pairs of W and Si by magnetron sputtering at room temperature in argon with 2 microns background pressure. The nominal composition was about $W_{25}Si_{75}$. The comparison in peak intensity in cps for the Mg, Na and F K α reflections are shown in Table 8.

TABLE 8

|      | W:Si Structure | TAP  |
|------|----------------|------|
| Mg-1 | 900            | 330  |
| Mg-2 | 1400           | 260  |
| Mg-3 | 1325           | 260  |
| Mg-4 | 1250           | 260  |
| Mg-5 | 980            | 260  |
| Na-1 | 4350           | 1450 |
| Na-2 | 4750           | 1450 |
| Na-3 | 4500           | 1450 |
| Na-4 | 4100           | 1450 |
| F-1  | 860            | 300  |
| F-2  | 800            | 300  |
| F-3  | 860            | 300  |
| F-4  | 830            | 300  |

The structures of the invention were almost 3 times greater than the TAP crystal for Mg K α at one d spacing, almost 4 times better at one d spacing and greater than 4 times better at three d spacings. The W:Si structures had respective d spacings of 35Å for Mg-1, 25Å for Mg-2 and Mg-3, 26Å for Mg-4 and 24Å for Mg-5. The TAP crystal had a d spacing of 12.88Å for Mg-1 and 26Å for Mg-2 through Mg-5. The structures of the invention were also almost 3 times greater than the TAP crystal for Na K α for four d spacings. The structures had respective d spacings of 25Å for Na-1, 26Å for Na-2, 26Å for Na-3 and 24Å for Na-4. The TAP crystal had a d spacing of 26Å. The structures of the invention were more than 2 times greater than the TAP crystal for F K α at four d spacings. The structures had respective d spacings of 25Å for F-1, 25Å for F-2, 26Å for F-3 and 24Å for F-4. The TAP crystal had a d spacing of 26Å. The measurements were made in accordance with those described in Table 5. Part of the large difference is due to the enhanced electron density contrast.

An example of a specific curved map crystal which can be replaced by the structures of the present application is a RAP (rubidium acid phthalate) crystal. The structure was formed from 200 layer pairs of Hf and Si by magnetron sputtering at room temperature in argon with 2 microns background pressure. The nominal composition was about $Si_{60}Hf_{40}$. The comparison for F K α reflection is shown in Table 9.

TABLE 9

|   | Hf:Si Structure $I_p$ | RAP $I_p$ |
|---|-----------------------|-----------|
| F | $1.10 \times 10^5$    | $1.66 \times 10^4$ |

The present structure was more than 6 times better than the RAP crystal for F K α detection. These measurements were made in a JEOL WDS Spectrometer by standard techniques under substantially identical operating conditions for each test as described above. The Hf:Si structure had a d spacing of 20Å and the RAP crystal had a d spacing of 13Å.

Many modifications and variations of the present invention are possible in light of the above teachings. While the preferred materials are set forth above, other metals can be utilized in the metallic layers, at least in small substitutional amounts. Tantalum has a covalent radius of 1.34Å, an electronegativity of 1.5 and a bond length of 2.86Å. Ta can best be utilized in the range of 9.33 to 56.27Å. Platinum has a covalent radius of 1.37Å, an electronegativity of 2.2 and a bond length of 2.75Å. Pt can best be utilized in the range of 7.8 to 48Å. Iridium has a covalent radius of 1.36Å, an electronegativity of 2.2 and a bond length of 2.71Å. Ir can best be utilized in the range of 8.4 to 50Å. Gold has a covalent radius of 1.46Å, an electronegativity of 2.4 and a bond length of 2.88Å. As can best be utilized in the range of 7.5 to 47Å. Each of these ranges is outside of the major absorption and fluorescent region. Also, although sputtering targets are most easily formed of the compound $B_4C$, essentially pure boron targets also can be utilized to form boron layered structures. The ion beam or sputtering flux can be profiled to control the uniformity of the deposited structure over the substrate area. This allows the construction of structures whose d spacing can be varied in a controlled fashion across the surface of the substrate and subsequent layers. The type of substrate is not critical and can include any prior lsm type of substrate, including polished silicon wafers, glass, metal, quartz, sapphire or flexible plastic. It is, therefore, to be understood that within the scope of the appended claims, the invention may be practiced otherwise than as specifically described.

What is claimed and desired to be secured by Letters Patent of the United States is:

1. An improved X-ray dispersive structure comprising: a plurality of layer pairs formed on one another, said layer pairs having X-ray dispersive properties over a predetermined range of interest, one layer of each of said layer pairs is a non-metallic material chosen from the group consisting of Si, C, B, and $B_4C$ and the second layer of each of said layer pairs is a metallic material, and a buffer layer formed of a material different from the materials forming the first and second layers, chosen from the group consisting of Si, Ge, and SiGe, and having a thickness of 1.3 Angstroms to 5 Angstroms between each metallic and non-metallic layer to provide control of interdiffusion or chemical interaction between said metallic and non-metallic layers.

2. The structure as defined in claim 1 wherein:
said buffer layer is formed from Si.

3. A method of making an improved X-ray dispersive structure comprising:
forming a plurality of layer pairs on one another to have X-ray dispersive properties over a predetermined range of interest, forming one layer of each of said layer pairs of a non-metallic material chosen from the group consisting of Si, C, B and $B_4C$, forming the second layer of each of said layer pairs from a metallic material, and forming a buffer layer formed of a material different from the materials, forming the first and second layers, chosen from the group consisting of Si, Ge, and SiGe, and having a thickness of 1.3 Angstroms to 5 Angstroms between each metallic and non-metallic layer to provide control of interdiffusion or chemical interaction between said metallic and non-metallic layers.

4. The method as defined in claim 3 including:
forming said buffer layer from Si.

5. An improved X-ray dispersive structure comprising:
a plurality of layer pairs formed on one another, said layer pairs having X-ray dispersive properties over a predetermined range of interest, one layer of each of said layer pairs consisting essentially of boron and the second layer of each of said layer pairs is formed from a metallic material and said metallic material layer contains at least Hf.

6. The structure as defined in claim 5 wherein:
said layer consisting essentially of boron further includes carbon.

7. A method of making an improved X-ray dispersive structure comprising:
forming a plurality of layer pairs on one another to have X-ray dispersive properties over a predetermined range of interest, including forming one layer of each of said layer pairs from essentially boron and forming the second layer of each of said layer pairs from a metallic material and forming said metallic material layer from at least Hf.

8. The method as defined in claim 7 including:
forming said layer consisting essentially of boron and including carbon therein.

9. A method of making an improved X-ray dispersive structure comprising:
forming a plurality of layer pairs on one another to have X-ray dispersive properties over a predetermined range of interest, including boron in one layer of each of said layer pairs and forming the second layer of each of said layer pairs from a metallic material, including forming said boron including layer from $B_4C$.

10. The method as defined in claim 9 including:
said predetermined range of interest including wavelengths of 9.75Å to 44.7Å.

11. An improved X-ray dispersive structure comprising:
a plurality of layer pairs formed on one another, said layer pairs having X-ray dispersive properties over a predetermined range of interest, one layer of each of said layer pairs includes boron and the second layer of each of said layer pairs is formed from a metallic material, said boron including layer is $B_4C$.

12. The structure as defined in claim 11 wherein:
said predetermined range of interest includes wavelengths of 9.75Å to 44.7Å.

13. An improved X-ray dispersive structure comprising:
a plurality of layer pairs formed on one another, said layer pairs having X-ray dispersive properties over a predetermined range of interest, one layer of each of said layer pairs includes carbon and the second layer of each of said layer pairs is formed from a metallic material, said metallic material containing at least Hf and a buffer layer formed of a material selected from the group consisting of Si, Ge and SiGe and having a thickness of 1.3 Angstroms to 5 Angstroms between each said one layer and said second layer.

14. The structure as defined in claim 13 wherein:
said metallic material is Hf:W.

15. The structure as defined in claim 13 wherein:
said metallic material layer includes at least one of the group consisting of Ta, Pt, Ir and Au.

16. The structure as defined in claim 13 wherein:
said predetermined range of interest includes wavelengths of 9.75Å to 19Å.

17. A method of making an improved X-ray dispersive structure comprising:
forming a plurality of layer pairs on one another to have X-ray dispersive properties over a predetermined range of interest, including carbon in one layer of each of said layer pairs and forming the second layer of each of said layer pairs from a metallic material, said metallic material containing at least Hf and forming a buffer layer of a material selected from the group consisting of Si, Ge and SiGe and having a thickness of 1.3 Angstroms to 5 Angstroms between each said one layer and said second layer.

18. The method as defined in claim 17 including:
forming said metallic material layer of Hf:W.

19. The method as defined in claim 17 including:
forming said metallic material layer from at least one of the group consisting of Ta, Pt, Ir and Au.

20. The method as defined in claim 17 including: said predetermined range of interest includes wavelengths of 9.75Å to 19Å.

* * * * *